US009781740B2

(12) United States Patent
Ni et al.

(10) Patent No.: US 9,781,740 B2
(45) Date of Patent: Oct. 3, 2017

(54) METHOD AND DEVICE FOR SCHEDULING RESOURCE IN COORDINATED MULTI-POINT TRANSMISSION

(71) Applicant: China Academy of Telecommunications Technology, Beijing (CN)

(72) Inventors: Hao Ni, Beijing (CN); Qiubin Gao, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 163 days.

(21) Appl. No.: 14/761,304

(22) PCT Filed: Jan. 16, 2014

(86) PCT No.: PCT/CN2014/070729
§ 371 (c)(1),
(2) Date: Jul. 15, 2015

(87) PCT Pub. No.: WO2014/111030
PCT Pub. Date: Jul. 24, 2014

(65) Prior Publication Data
US 2015/0365967 A1 Dec. 17, 2015

(30) Foreign Application Priority Data
Jan. 21, 2013 (CN) .......................... 2013 1 0021861

(51) Int. Cl.
*H04W 72/02* (2009.01)
*H04W 72/12* (2009.01)
(Continued)

(52) U.S. Cl.
CPC ...... *H04W 72/1278* (2013.01); *H04B 7/0456* (2013.01); *H04B 7/0626* (2013.01);
(Continued)

(58) Field of Classification Search
CPC ......... H04W 72/1278; H04W 72/1231; H04W 72/1226; H04B 7/0456; H04B 7/0626; H04L 5/0035; H04L 5/0073
See application file for complete search history.

(56) References Cited

U.S. PATENT DOCUMENTS 8,588,324 B2 * 11/2013 Mondal ................. H04B 7/024
370/252
8,867,477 B2 * 10/2014 Song ................. H04W 72/1231
370/328
(Continued)

FOREIGN PATENT DOCUMENTS

CN 101888665 A 11/2010
CN 102013903 A 4/2011
(Continued)

OTHER PUBLICATIONS

International Search Report for PCT/CN2014/070729.
(Continued)

*Primary Examiner* — Jay P Patel
(74) *Attorney, Agent, or Firm* — Kilpatrick Townsend & Stockton LLP

(57) ABSTRACT

The embodiments of the present application disclose a method and a device for scheduling a resource in coordinated multi-point transmission and relate to the field of the wireless communications, so as to reduce the delay of a non-center coordination scheduling solution under the coordinated multi-point CoMP transmission and improve the scheduling efficiency. The solution comprises: a serving base station determining, according to a preset result of a negotiation with a coordinated base station, a final precoding matrix the coordinated base station prohibits; scheduling a resource according to channel state information (CSI) reported by a user terminal and the final precoding matrix the coordinated base station prohibits, and the coordinated
(Continued)

base station scheduling the resource according to the CSI reported by the user terminal and the final precoding matrix the coordinated base station prohibits. By using the solution, the efficiency of the resource scheduling can be improved.

17 Claims, 5 Drawing Sheets

(51) Int. Cl.
H04L 5/00 (2006.01)
H04B 7/0456 (2017.01)
H04B 7/06 (2006.01)

(52) U.S. Cl.
CPC ....... *H04L 5/0035* (2013.01); *H04W 72/1226* (2013.01); *H04W 72/1231* (2013.01); *H04L 5/0073* (2013.01)

(56) References Cited

U.S. PATENT DOCUMENTS

| | | | | |
|---|---|---|---|---|
| 9,332,528 B2* | 5/2016 | Kim | | H04W 72/02 |
| 2010/0315957 A1* | 12/2010 | Koo | | H04B 7/15592 |
| | | | | 370/246 |
| 2011/0124345 A1 | 5/2011 | Lee et al. | | |
| 2012/0057484 A1* | 3/2012 | Wan | | H04L 1/0026 |
| | | | | 370/252 |
| 2012/0057540 A1* | 3/2012 | Fang | | H04B 7/024 |
| | | | | 370/329 |
| 2012/0082118 A1* | 4/2012 | Long | | H04B 7/024 |
| | | | | 370/329 |
| 2012/0113897 A1* | 5/2012 | Thiele | | H04B 7/024 |
| | | | | 370/328 |
| 2012/0114062 A1* | 5/2012 | Zhang | | H04B 7/024 |
| | | | | 375/285 |
| 2012/0122468 A1* | 5/2012 | Gao | | H04B 7/026 |
| | | | | 455/452.1 |
| 2012/0122507 A1 | 5/2012 | Gao et al. | | |
| 2012/0176982 A1* | 7/2012 | Zirwas | | H04B 7/024 |
| | | | | 370/329 |
| 2013/0107849 A1* | 5/2013 | Park | | H04B 7/0417 |
| | | | | 370/329 |
| 2013/0148515 A1* | 6/2013 | Ribeiro | | H04L 5/0094 |
| | | | | 370/252 |
| 2013/0156121 A1* | 6/2013 | Abe | | H04B 7/024 |
| | | | | 375/267 |
| 2013/0242921 A1* | 9/2013 | Kim | | H04B 7/024 |
| | | | | 370/329 |
| 2013/0273931 A1* | 10/2013 | Lunttila | | H04W 24/10 |
| | | | | 455/452.2 |
| 2013/0301420 A1* | 11/2013 | Zhang | | H04W 76/048 |
| | | | | 370/241 |
| 2014/0126383 A1* | 5/2014 | Tong | | H04L 1/0026 |
| | | | | 370/241 |
| 2015/0085692 A1* | 3/2015 | Wang | | H04B 17/318 |
| | | | | 370/252 |
| 2015/0341817 A1* | 11/2015 | Davydov | | H04W 72/042 |
| | | | | 370/252 |

FOREIGN PATENT DOCUMENTS

| | | | | |
|---|---|---|---|---|
| CN | 102013905 A | | 4/2011 | |
| CN | WO2011038661 | * | 4/2011 | ............... H04B 7/04 |
| CN | WO2011038675 | * | 4/2011 | ............ H04W 16/28 |
| CN | 102325375 A | | 1/2012 | |

OTHER PUBLICATIONS

Alcatel-Lucent et al: "Estimation of extended PMI feedback signalling required for user intra-cell and inter-cell coordination", 3GPP Draft; R1-100419_ESTIM_PMI_FDBCK_SIG_USER_PCOOR5, 3rd Generation Partnership Project (3GPP), Mobile Competence Centre ; 650, Route Des Lucioles ; F-06921 Sophia-Antipolis Cedex; France, vol. RAN WG1, no. Valencia, Spain; Jan. 18, 2010, Jan. 12, 2010 (Jan. 12, 2010), XP050418069, [retrieved on Jan. 12, 2010].
Weidong Ning et al: "An opportunistic feedback scheme for downlink coordinated scheduling/beamforming" , Computing, Communications and Applications Conference (COMCOMAP), 2012, IEEE, Jan. 11, 2012 (Jan. 11, 2012), pp. 76-80, XP032117792, DOI: 10.1109/COMCOMAP.2012.6154006 ISBN: 978-1-4577-1717-8.
The Extended European Search Report dated Dec. 8, 2015 in the EP counterpart application (14740911.4).
Motorola Mobility; CoMP schemes with backhaul constraints and the modeling discussion; 3GPP TSG RAN1 #64, R1-110871; Feb. 15, 2011; 6 pages.
Report of "2012 Computing, Communications and Applications Conference", Hong Kong, China, 12 pages, Jan. 11-13, 2012.

* cited by examiner

METHOD AND DEVICE FOR SCHEDULING RESOURCE IN COORDINATED MULTI-POINT TRANSMISSION

This application is a US National Stage of International Application No. PCT/CN2014/070729, filed Jan. 16, 2014, designating the United States, and claiming the benefit of Chinese Patent Application No. 201310021861.3, filed with the State Intellectual Property Office of People's Republic of China on Jan. 21, 2013 and entitled "Method and device for scheduling resource in coordinated multi-point transmission", which is hereby incorporated by reference in its entirety.

FIELD

The present invention relates to the field of wireless communications and particularly to a method and device for scheduling resources in coordinated multi-point transmission.

BACKGROUND

Coordinated Multi-Point (CoMP) transmission technology has been applied in a Long Term Evolution-Advance (LTE-A) system, to thereby reduce interference from an adjacent cell for a User Equipment (UE) at the edge of a coverage area of a small cell, so as to improve an experience of the UE at the edge of the cell. Coordinated Multi-Point (CoMP) transmission technology refers to coordination between multiple Transmission Points (TPs) separate in geographical position. Typically multiple transmission points refer to base stations of different cells, or a base station of a cell and multiple Remote Radio Heads (RRHs) controlled by the base station. CoMP transmission technology can be categorized into downlink coordinated transmission and uplink joint reception. Downlink coordinated multi-point transmission is generally further categorized into two transmission schemes of Coordinated Scheduling/Coordinated Beam-forming (CS/CB) and Joint Processing (JP). In the CS/CB scheme, one of multiple transmission points transmits a useful signal to the UE, and interference of the other transmission points to the UE is reduced as much as possible through joint scheduling and beam-forming. The joint processing scheme can be further categorized into Joint Transmission (JT) scheme and Dynamic Point Selection (DPS) scheme. In the JT scheme, multiple transmission points transmit useful signals to the UE concurrently, to thereby enhance the received signal of the UE. In the DPS scheme, the transmission point to the UE is switched dynamically, by selecting the optimum one for the UE among the cooperating transmission points, to transmit a signal to the UE. These schemes of coordinated multi-point transmission may be applied in combination with each other, or may be combined with Dynamic Blanking, to disable some transmission points from transmitting signals over some time-frequency resources.

The base stations needs to exchange a large amount of information and data in coordinated multi-point transmission. Information and data are exchanged between the base stations in a Long Term Evolution (LTE) system via an X2 interface. An information transmission rate and a transmission delay via the X2 interface are determined by the characteristic of a physical link, and the delay of a protocol stack, of the X2 interface. If the base stations are connected by a high-capacity physical link, e.g., connected directly by an optic fiber, then there is a high information transmission rate via the X2 interface (e.g., at the order of 1 Gbps). If the base stations are connected by a low-capacity physical link, e.g., a radio transmission link, then there is a low information transmission rate via the X2 interface (e.g., 1 Mbps or lower). The delay via the X2 interface arises primarily from the delay of the physical layer transmission, and the delay of the protocol stack and may be up to 10 ms or more. There may be a variety of physical connection modes of the X2 interface in a practical network, and information shall be exchanged between the base stations in CoMP coordinated scheduling by taking a non-ideal X2 interface into account.

Downlink coordinated multi-point transmission is realized based upon Channel State Information (CSI) obtained by the base stations, and the CSI are information of the channels from the UE to the respective transmission points. The CSI information includes Channel Quality Indicator (CQI) information, Pre-coding Matrix Indicator (PMI) information, Rank Indicator (RI) information, etc. The UE measures information of the channels from the respective base stations to the UE by using downlink reference signals transmitted by the base stations, and feeds the channel state information measured by the UE to a serving cell of the UE. The serving cell of the UE receives the fed-back CSI information and performs coordinated scheduling and/or coordinated pre-coding with the cooperating cells, to thereby enable coordinated transmission. Schemes of coordinated scheduling and/or coordinated pre-coding between the cells can be categorized into centralized coordinated scheduling and distributed coordinated scheduling.

Centralized coordinated scheduling generally includes the following operations:

A. The respective cooperating base stations transmit the received CSI information of all the UEs accessing the respective base stations to a Central Coordination Node (CCN);

B. The CCN centrally schedules time and frequency resources for all the UEs of the cooperating base stations, and calculates pre-coding for the UEs for which the time and frequency resources are scheduled;

C. The CCN transmits scheduling and pre-coding results of the respective UEs to the respective related base stations; and D. The base stations transmit data for the UEs according to the received scheduling and pre-coding results.

In the centralized coordinated scheduling scheme, the scheduling CCN may perform global optimized scheduling for all the UEs in the cooperation set according to the global CSI information, to thereby achieve an ideal cooperation gain. However as demonstrated in the operations of centralized coordinated scheduling, centralized coordinated scheduling requires the cooperating base stations to transmit the CSI information of all the accessing UEs to the CCN, and the CCN needs to transmit all the scheduling results respectively to the respective base stations after scheduling, as illustrated in FIG. 1. Transmission needs to be performed at least twice between the CCN and the base stations, so that with respect to a non-ideal X2 port connection, there may be a significant delay for the transmission via the X2 port, thus resulting in a considerable scheduling delay and a loss of transmission performance.

A general principle of distributed coordinated scheduling lies in that the respective cooperating base stations schedule respectively; and the cooperating base stations cooperate by exchanging the scheduling information, the CSI information of the scheduled UEs, etc.

From the perspective of the principle, distributed coordinated scheduling is performed respectively at the respective cooperating base stations without exchanging a large amount of CSI information via the X2 interface, so that there is a less amount of information transmitted via the X2 interface than in centralized coordinated scheduling, as illustrated in FIG. 2. However, distributed coordinated scheduling can not optimize a global scheduling result according to scheduling conditions between the base stations. In order to achieve a nearly globally-optimized result, iterative scheduling between the base stations may need to be performed, so that the cooperating base stations may need to exchange the scheduling information with each other repeatedly. If there is a significant delay via the X2 interface between the base stations, then repeated exchanges of the scheduling information in distributed coordinated scheduling may come with such a high scheduling delay that the channel information may become outdated, thus degrading the transmission performance Thus, the scheme of CoMP distributed coordinated scheduling needs to be designed carefully in the scenario with a significant delay via the X2 interface, to thereby minimize the number of times that the information is exchanged between the cooperating base stations, to thereby lower the amount of exchanged information.

In summary, there is such a large amount of information exchanged between the base stations in the existing scheme of CoMP centralized coordinated scheduling that there may be a significant loss of the system performance, if the scheme is implemented by using a non-ideal link of the X2 interface; and the scheduling information needs to be exchanged iteratively in iterative distributed coordinated scheduling, so that there will be a considerable increase in transmission delay via the X2 interface with a significant delay.

SUMMARY

Embodiments of the present disclosure provide a method and device for scheduling resources in coordinated multi-point transmission, so as to reduce the delay in the scheme of centralized coordinated scheduling for CoMP, so as to improve the efficiency of scheduling.

A method for scheduling resources in CoMP transmission, includes:

receiving, by a serving base station, CSI reported by UEs, and determining resulting pre-coding matrixes prohibited from being used by a cooperating base station, according to a result of pre-negotiation with the cooperating base station; and performing, by the serving base station, resource scheduling, according to the received CSI, and the resulting pre-coding matrixes prohibited from being used by the cooperating base station.

In this solution, the serving base station pre-negotiates with the cooperating base station about the resulting pre-coding matrixes prohibited from being used by the cooperating base station, to thereby perform subsequent resource scheduling, according to the result of negotiation, without exchanging information between the serving base station and the cooperating base station every time before resource scheduling is performed, to thereby lower a delay of transmission via an X2 interface between the serving base station and the cooperating base station, and thus improve the efficiency of scheduling.

Preferably before the serving base station receives the CSI reported by the UEs, the method further includes:

determining, by the serving base station, pre-coding matrixes requested for being prohibited from being used by the cooperating base station, and sending to the cooperating base station an indicator of the pre-coding matrixes requested for being prohibited from being used by the cooperating base station; and receiving, by the serving base station, an indicator, sent by the cooperating base station, of the resulting pre-coding matrixes prohibited from being used by the cooperating base station, and determining the resulting pre-coding matrixes prohibited from being used by the cooperating base station according to the indicator, wherein the cooperating base station determines the resulting pre-coding matrixes prohibited from being used by the cooperating base station in such a way that:

the cooperating base station determines a set of candidate prohibited pre-coding matrixes, according to CSI reported by the UEs; determines the set of pre-coding matrixes requested by the serving base station for being prohibited from being used by the cooperating base station according to the indicator, sent by the serving base station, of the pre-coding matrixes requested for being prohibited from being used by the cooperating base station; and determine pre-coding matrixes in an intersection of the set of pre-coding matrixes requested by the serving base station for being prohibited from being used by the cooperating base station, and the set of candidate prohibited pre-coding matrixes as the resulting pre-coding matrixes prohibited from being used by the cooperating base station.

Determining, by the serving base station, the pre-coding matrixes requested for being prohibited from being used by the cooperating base station may include but will not be limited to:

determining, by the serving base station, a downlink transmission performance index of each UE served by the serving base station respectively according to the CSI of the serving base station reported by the corresponding UE, and searching the downlink transmission performance indexes of the respective UEs for one or more downlink transmission performance indexes indicating the highest transmission performance; and determining a pre-coding matrix or pre-coding matrixes corresponding to a PMI or PMIs of the cooperating base station, and a pre-coding matrix or pre-coding matrixes in a relevance range or relevance ranges of the PMI or PMIs as the pre-coding matrixes requested for being prohibited from being used by the cooperating base station, wherein the PMI or PMIs of the cooperating base station are reported by a CoMP UE or UEs corresponding to the found downlink transmission performance index or indexes.

Here sending, by the serving base station, to the cooperating base station the indicator of the pre-coding matrixes requested for being prohibited from being used by the cooperating base station may include but will not be limited to:

sending, by the serving base station, at least one PMI, and information about relevance range of each of the at least one PMI to the cooperating base station, wherein a pre-coding matrix corresponding to the at least one PMI, and a pre-coding matrix in the relevance range of each PMI constitute the pre-coding matrixes requested by the serving base station for being prohibited from being used by the cooperating base station.

Preferably the indicator, transmitted by the cooperating base station, of the resulting pre-coding matrixes prohibited from being used by the cooperating base station includes at least one PMI, and information about relevance range of each of the at least one PMI to the cooperating base station, wherein a pre-coding matrix corresponding to the at least one PMI, and a pre-coding matrix in the relevance range of each PMI constitute the resulting pre-coding matrixes prohibited from being used by the cooperating base station.

Further to any one of the embodiments above of the present disclosure, preferably performing, by the serving base station, resource scheduling according to the received CSI, and the resulting pre-coding matrixes prohibited from being used by the cooperating base station may include but will not be limited to:

determining, by the serving base station, interference to downlink transmission of the UEs served by the serving base station, according to the resulting pre-coding matrixes prohibited from being used by the cooperating base station, wherein the interference does not contain interference generated when the resulting pre-coding matrixes prohibited from being used by the cooperating base station are used by the cooperating base station; and scheduling, by the serving base station, resources for the UEs served by the serving base station, according to the interference to downlink transmission of the UEs served by the serving base station, and the received CSI.

Further to any one of the embodiments above of the present disclosure, preferably after the serving base station performs resource scheduling, the method further may include but will not be limited to:

informing, by the serving base station, to the cooperating base station whether the cooperating base station is allowed to use the resulting pre-coding matrixes prohibited from being used by the cooperating base station over a scheduling resource, according to a result of scheduling the resource.

Furthermore informing, by the serving base station, to the cooperating base station whether the cooperating base station is allowed to use the resulting pre-coding matrixes prohibited from being used by the cooperating base station over the scheduling resource, according to the result of scheduling the resource includes:

if the serving base station does not schedule any CoMP UE over the scheduling resource, then informing the cooperating base station that the cooperating base station is allowed to use the resulting pre-coding matrixes prohibited from being used by the cooperating base station over the scheduling resource; and if the serving base station schedules a CoMP UE over the scheduling resource, then informing the cooperating base station that the cooperating base station is not allowed to use the resulting pre-coding matrixes prohibited from being used by the cooperating base station over the scheduling resource; or not informing the cooperating base station that the cooperating base station is allowed to use the resulting pre-coding matrixes prohibited from being used by the cooperating base station over the scheduling resource.

A method for scheduling resources in CoMP transmission includes:

receiving, by a cooperating base station, CSI reported by each UE, and determining resulting pre-coding matrixes prohibited from being used by the cooperating base station, according to a result of pre-negotiating with a serving base station;

performing, by the cooperating base station, resource scheduling according to the received CSI, and the resulting pre-coding matrixes prohibited from being used by the cooperating base station.

In this solution, the serving base station pre-negotiates with the cooperating base station about the resulting pre-coding matrixes prohibited from being used by the cooperating base station, to thereby perform subsequent resource scheduling according to the result of negotiation, without exchanging information between the serving base station and the cooperating base station every time before resource scheduling is performed, to thereby lower a transmission delay via an X2 interface between the serving base station and the cooperating base station and thus improve the efficiency of scheduling.

Preferably before the cooperating base station receives the CSI reported by the UEs, the method further includes:

determining, by the cooperating base station, a set of candidate prohibited pre-coding matrixes according to the CSI reported by the UEs; and receiving, by the cooperating base station, an indicator, sent by the serving base station, of pre-coding matrixes requested for being prohibited from being used by the cooperating base station; determining a set of pre-coding matrixes requested by the serving base station for being prohibited from being used by the cooperating base station, according to the indicator; determining pre-coding matrixes in an intersection of the set of pre-coding matrixes requested by the serving base station for being prohibited from being used by the cooperating base station, and the set of candidate prohibited pre-coding matrixes as the resulting pre-coding matrixes prohibited from being used by the cooperating base station; and sending an indicator of the resulting pre-coding matrixes prohibited from being used by the cooperating base station to the serving base station.

Here the indicator, sent by the serving base station, of the pre-coding matrixes requested for being prohibited from being used by the cooperating base station includes at least one PMI, and information about relevance range of each of the at least one PMI to the cooperating base station, and a pre-coding matrix corresponding to the at least one PMI, and a pre-coding matrix in the relevance range of each PMI constitute the pre-coding matrixes requested by the serving base station for being prohibited from being used by the cooperating base station.

Preferably determining, by the cooperating base station, the set of candidate prohibited pre-coding matrixes according to the CSI reported by the UEs includes:

determining, by the cooperating base station, a downlink transmission performance index of each UE served by the cooperating base station respectively according to the CSI of the cooperating base station reported by the corresponding UE; and searching the downlink transmission performance indexes of the respective UEs for one or more downlink transmission performance indexes indicating the lowest transmission performance, and determining a set including a pre-coding matrix or pre-coding matrixes corresponding to a PMI or PMIs of the cooperating base station, and a pre-coding matrix or pre-coding matrixes in a relevance range or relevance ranges of the PMI or PMIs as the set of candidate prohibited pre-coding matrixes, wherein the PMI or PMIs of the cooperating base station are reported by the UE or UEs corresponding to the found downlink transmission performance index or indexes; or searching the downlink transmission performance indexes of the respective UEs for one or more downlink transmission performance indexes indicating the highest transmission performance, and determining a pre-coding matrix or pre-coding matrixes corresponding to a PMI or PMIs of the cooperating base station, and a pre-coding matrix or pre-coding matrixes in a relevance range or relevance ranges of the PMI or PMIs as pre-coding matrixes which are not allowed to be prohibited, wherein the PMI or PMIs of the cooperating base station are reported by the UE or UEs corresponding to the found downlink transmission performance index or indexes, and determining a set including the other pre-coding matrixes than the pre-coding matrixes which are not allowed to be prohibited, as the set of candidate prohibited pre-coding matrixes.

Preferably sending, by the cooperating base station, the indicator of the resulting pre-coding matrixes prohibited from being used by the cooperating base station to the serving base station includes:

sending, by the cooperating base station, at least one PMI, and information about relevance range of each of the at least one PMI to the serving base station, wherein a pre-coding matrix corresponding to the at least one PMI, and a pre-coding matrix in the relevance range of each PMI constitute the resulting pre-coding matrixes prohibited from being used by the cooperating base station.

Preferably performing, by the cooperating base station, resource scheduling according to the received CSI, and the resulting pre-coding matrixes prohibited from being used by the cooperating base station includes:

determining, by the cooperating base station, whether any notification, transmitted by the serving base station and the other respective cooperating base stations, indicating that the cooperating base station is allowed to use the resulting pre-coding matrixes prohibited from being used by the cooperating base station over a scheduling resource, has been received; and if so, then performing resource scheduling according to the CSI reported by the UEs; otherwise, performing resource scheduling according to the CSI reported by the UEs, and the resulting pre-coding matrixes prohibited from being used by the cooperating base station.

A serving base station includes:

a first receiving unit configured to receive CSI reported by each UE;

a first determining unit configured to determine resulting pre-coding matrixes prohibited from being used by a cooperating base station, according to a result of pre-negotiation with the cooperating base station; and a scheduling unit configured to perform resource scheduling according to the received CSI, and the resulting pre-coding matrixes prohibited from being used.

In this solution, the serving base station pre-negotiates with the cooperating base station about the resulting pre-coding matrixes prohibited from being used by the cooperating base station, to thereby perform subsequent resource scheduling according to the result of negotiation, without exchanging information between the serving base station and the cooperating base station every time before resource scheduling is performed, to thereby lower a transmission delay via an X2 interface between the serving base station and the cooperating base station and thus improve the efficiency of scheduling.

Preferably the serving base station further includes:

a second determining unit configured to determine pre-coding matrixes requested for being prohibited from being used by the cooperating base station;

a sending unit configured to send to the cooperating base station an indicator of the pre-coding matrixes requested for being prohibited from being used by the cooperating base station; and a third determining unit configured to receive an indicator, sent by the cooperating base station, of the resulting pre-coding matrixes prohibited from being used by the cooperating base station, and to determine the resulting pre-coding matrixes prohibited from being used by the cooperating base station according to the indicator, wherein the cooperating base station determines the resulting pre-coding matrixes prohibited from being used by the cooperating base station by determining a set of candidate prohibited pre-coding matrixes according to CSI reported by each UE; determining the set of pre-coding matrixes requested by the serving base station for being prohibited from being used by the cooperating base station according to the indicator, sent by the serving base station, of the pre-coding matrixes requested for being prohibited from being used by the cooperating base station; and determining pre-coding matrixes in an intersection of the set of pre-coding matrixes requested by the serving base station for being prohibited from being used by the cooperating base station, and the set of candidate prohibited pre-coding matrixes as the resulting pre-coding matrixes prohibited from being used by the cooperating base station.

Preferably the second determining unit is configured:

to determine a downlink transmission performance index of each UE served by the serving base station respectively according to the CSI of the serving base station reported by the corresponding UE, and to search the downlink transmission performance indexes of the respective UEs for one or more downlink transmission performance indexes indicating the highest transmission performance; and to determine a pre-coding matrix or pre-coding matrixes corresponding to a PMI or PMIs of the cooperating base station, and a pre-coding matrix or pre-coding matrixes in a relevance range or relevance ranges of the PMI or PMIs as the pre-coding matrixes requested for being prohibited from being used by the cooperating base station, wherein the PMI or PMIs of the cooperating base station are reported by a CoMP UE or UEs corresponding to the found downlink transmission performance index or indexes.

Preferably the sending unit is configured:

to send at least one PMI, and information about relevance range of each of the at least one PMI to the cooperating base station, wherein a pre-coding matrix corresponding to the at least one PMI, and a pre-coding matrix in the relevance range of each PMI constitute the pre-coding matrixes requested by the serving base station for being prohibited from being used by the cooperating base station.

Preferably the third determining unit is configured:

to receive the indicator, sent by the cooperating base station, of the resulting pre-coding matrixes prohibited from being used by the cooperating base station, wherein the indicator includes at least one PMI, and information about relevance range of each of the at least one PMI to the cooperating base station, and a pre-coding matrix corresponding to the at least one PMI, and a pre-coding matrix in the relevance range of each PMI constitute the resulting pre-coding matrixes prohibited from being used by the cooperating base station.

Further to any one of the embodiments above of the serving base station, preferably the scheduling unit is configured:

to determine interference to downlink transmission of the UEs served by the serving base station, according to the resulting pre-coding matrixes prohibited from being used by the cooperating base station, wherein the interference does not contain interference generated when the resulting pre-coding matrixes prohibited from being used by the cooperating base station are used by the cooperating base station; and to schedule resources for the UEs served by the serving base station, according to the interference to downlink transmission of the UEs served by the serving base station, and the received CSI.

Further to any one of the embodiments above of the serving base station, preferably the serving base station further includes:

an informing unit configured to inform the cooperating base station whether the cooperating base station is allowed to use the resulting pre-coding matrixes prohibited from being used by the cooperating base station over a scheduling resource, according to the result of scheduling the resource after resource scheduling is performed.

Preferably the informing unit is configured:

after resource scheduling is performed, if there is not any CoMP UE over the scheduling resource, to inform the cooperating base station that the cooperating base station is allowed to use the resulting pre-coding matrixes prohibited from being used by the cooperating base station over the scheduling resource; otherwise, to inform the cooperating base station that the cooperating base station is not allowed to use the resulting pre-coding matrixes prohibited from being used by the cooperating base station over the scheduling resource; or not to inform the cooperating base station that the cooperating base station is allowed to use the resulting pre-coding matrixes prohibited from being used by the cooperating base station over the scheduling resource.

Based upon the same inventive idea as the method, an embodiment of the present disclosure provides another serving base station including a radio frequency unit and a processor, wherein:

the radio frequency unit is configured to receive CSI reported by each UE; and the processor is configured to determine resulting pre-coding matrixes prohibited from being used by a cooperating base station, according to a result of pre-negotiation with the cooperating base station; and to perform resource scheduling according to the received CSI, and the resulting pre-coding matrixes prohibited from being used.

In this solution, the serving base station pre-negotiates with the cooperating base station about the resulting pre-coding matrixes prohibited from being used by the cooperating base station, to thereby perform subsequent resource scheduling according to the result of negotiation, without exchanging information between the serving base station and the cooperating base station every time before resource scheduling is performed, to thereby lower a transmission delay via an X2 interface between the serving base station and the cooperating base station and thus improve the efficiency of scheduling.

A cooperating base station includes:

a receiving unit configured to receive CSI reported by each UE;

a first determining unit configured to determine resulting pre-coding matrixes prohibited from being used by the cooperating base station, according to a result of pre-negotiating with a serving base station;

a scheduling unit configured to perform resource scheduling according to the received CSI, and the resulting pre-coding matrixes prohibited from being used by the cooperating base station.

In this solution, the serving base station pre-negotiates with the cooperating base station about the resulting pre-coding matrixes prohibited from being used by the cooperating base station to thereby perform subsequent resource scheduling according to the result of negotiation, without exchanging information between the serving base station and the cooperating base station every time before resource scheduling is performed, to thereby lower a transmission delay via an X2 interface between the serving base station and the cooperating base station and thus improve the efficiency of scheduling.

Preferably the cooperating base station further includes:

a second determining unit configured to determine a set of candidate prohibited pre-coding matrixes according to the CSI reported by the UEs;

a third determining unit configured to receive an indicator, sent by the serving base station, of pre-coding matrixes requested for being prohibited from being used by the cooperating base station; and to determine a set of pre-coding matrixes requested by the serving base station for being prohibited from being used by the cooperating base station, according to the indicator;

a fourth determining unit configured to determine pre-coding matrixes in an intersection of the set of pre-coding matrixes requested by the serving base station for being prohibited from being used by the cooperating base station, and the set of candidate prohibited pre-coding matrixes as the resulting pre-coding matrixes prohibited from being used by the cooperating base station; and a sending unit configured to send an indicator of the resulting pre-coding matrixes prohibited from being used by the cooperating base station to the serving base station.

Preferably the third determining unit is configured:

to receive the indicator, sent by the serving base station, of the pre-coding matrixes requested for being prohibited from being used by the cooperating base station, wherein the indicator includes at least one PMI, and information about relevance range of each of the at least one PMI to the cooperating base station, and a pre-coding matrix corresponding to the at least one PMI, and a pre-coding matrix in the relevance range of each PMI constitute the pre-coding matrixes requested by the serving base station for being prohibited from being used by the cooperating base station.

Preferably the second determining unit is configured:

to determine a set of candidate prohibited pre-coding matrixes, and particularly the cooperating base station determines a downlink transmission performance index of each UE served by the cooperating base station respectively according to the CSI of the cooperating base station reported by the corresponding UE; and to search the downlink transmission performance indexes of the respective UEs for one or more downlink transmission performance indexes indicating the lowest transmission performance, and to determine a set including a pre-coding matrix or pre-coding matrixes corresponding to a PMI or PMIs of the cooperating base station, and a pre-coding matrix or pre-coding matrixes in a relevance range or relevance ranges of the PMI or PMIs as the set of candidate prohibited pre-coding matrixes, wherein the PMI or PMIs of the cooperating base station are reported by the UE or UEs corresponding to the found downlink transmission performance index or indexes; or to search the downlink transmission performance indexes of the respective UEs for one or more downlink transmission performance indexes indicating the highest transmission performance, and to determine a pre-coding matrix or pre-coding matrixes corresponding to a PMI or PMIs of the cooperating base station, and a pre-coding matrix or pre-coding matrixes in a relevance range or relevance ranges of the PMI or PMIs as pre-coding matrixes which are not allowed to be prohibited, wherein the PMI or PMIs of the cooperating base station are reported by the UE or UEs corresponding to the found downlink transmission performance index or indexes, and to determine a set including the other pre-coding matrixes than the pre-coding matrixes which are not allowed to be prohibited, as the set of candidate prohibited pre-coding matrixes.

Preferably the sending unit is configured:

to send at least one PMI, and information about relevance range of each of the at least one PMI to the serving base station, wherein a pre-coding matrix corresponding to the at least one PMI, and a pre-coding matrix in the relevance range of each PMI constitute the resulting pre-coding matrixes prohibited from being used by the cooperating base station.

Preferably the scheduling unit is configured:

to determine whether any notification, transmitted by the serving base station and the other respective cooperating base stations, indicating that the cooperating base station is allowed to use the resulting pre-coding matrixes prohibited from being used by the cooperating base station over a scheduling resource, has been received; and if so, to perform resource scheduling according to the CSI reported by the UEs; otherwise, to perform resource scheduling according to the CSI reported by the UEs, and the resulting pre-coding matrixes prohibited from being used by the cooperating base station.

Based upon the same inventive idea as the method, an embodiment of the present disclosure provides another serving base station including a radio frequency unit and a processor, wherein:

the radio frequency unit is configured to receive CSI reported by each UE; and the processor is configured to determine resulting pre-coding matrixes prohibited from being used by the cooperating base station, according to a result of pre-negotiating with a serving base station; and to perform resource scheduling according to the received CSI, and the resulting pre-coding matrixes prohibited from being used by the cooperating base station.

In this solution, the serving base station pre-negotiates with the cooperating base station about the resulting pre-coding matrixes prohibited from being used by the cooperating base station, to thereby perform subsequent resource scheduling according to the result of negotiation, without exchanging information between the serving base station and the cooperating base station every time before resource scheduling is performed, to thereby lower a transmission delay via an X2 interface between the serving base station and the cooperating base station and thus improve the efficiency of scheduling.

DETAILED DESCRIPTION OF THE EMBODIMENTS

In order to lower a delay in the scheme of distributed coordinated scheduling in CoMP transmission, to thereby improve the efficiency of scheduling, embodiments of the present disclosure provide a method for scheduling resources in CoMP transmission.

Figure 1:
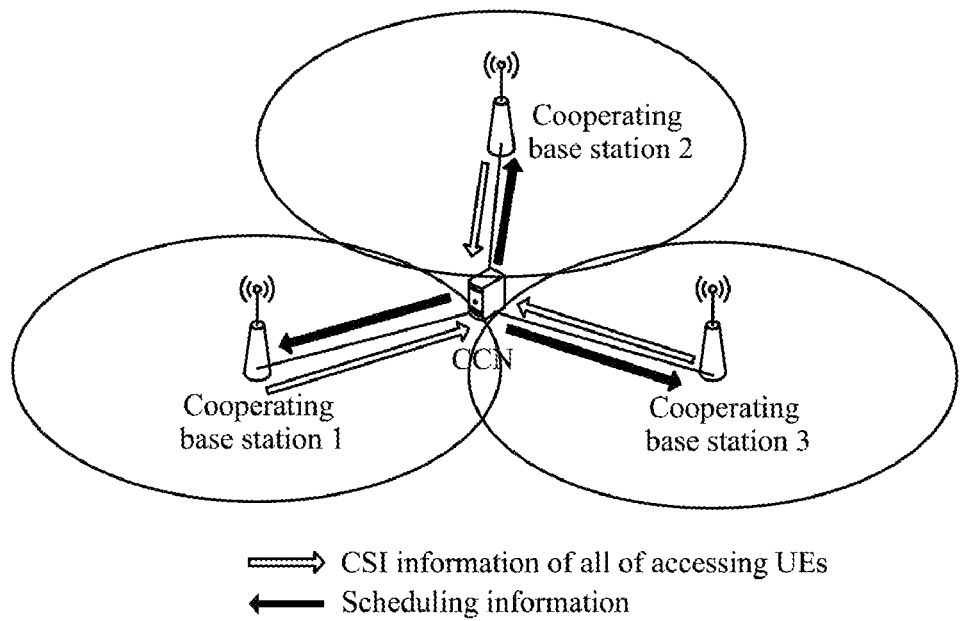
FIG. 1 illustrates a schematic diagram of information exchanging in centralized scheduling in the prior art.
Figure 2:
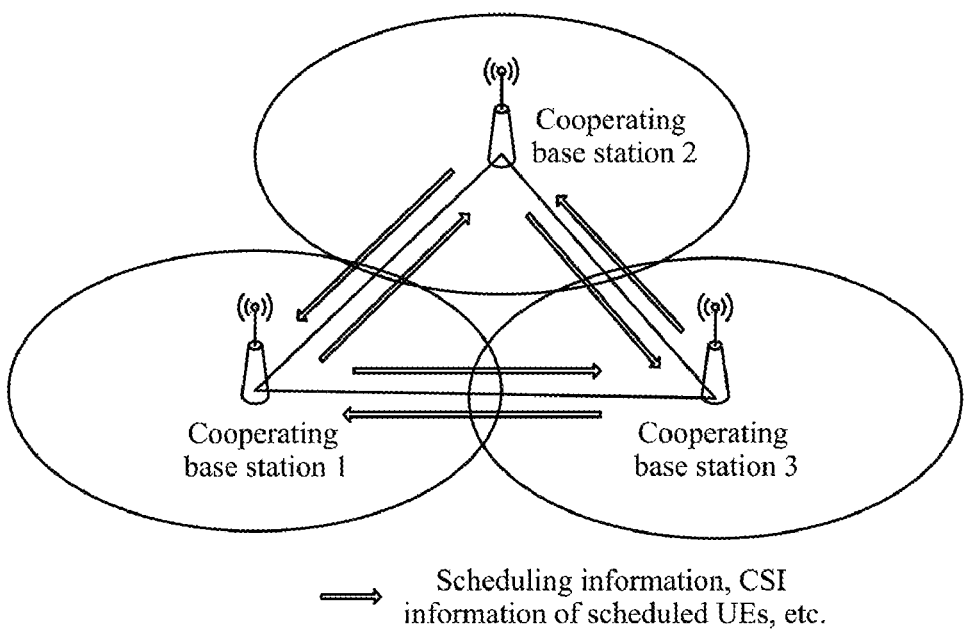
FIG. 2 illustrates a schematic diagram of information exchanging in distributed scheduling in the prior art.
Figure 3:
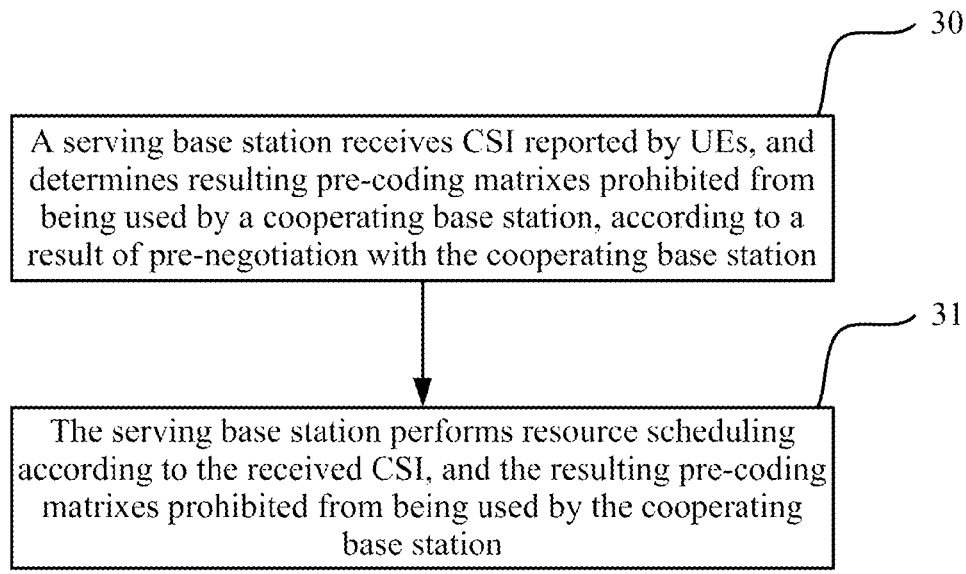
FIG. 3 illustrates a schematic flow chart of a method according to an embodiment of the present disclosure.

Referring to FIG. 3, a method for scheduling resources in CoMP transmission, according to an embodiment of the present disclosure includes the following operations:

Operation 30: A serving base station receives CSI reported by UEs, and determines resulting pre-coding matrixes prohibited from being used by a cooperating base station, according to a result of pre-negotiation with the cooperating base station, herein the CSI reported by the UEs may include one or any combination of a PMI, an RI and a CQI; and Operation 31: The serving base station performs resource scheduling, according to the received CSI, and the resulting pre-coding matrixes prohibited from being used by the cooperating base station.

Data may be transmitted to the UE, according to a result of resource scheduling after resource scheduling is performed in the flow illustrated in FIG. 3.

Before the operation 30, the serving base station may pre-negotiate with the cooperating base station about the resulting pre-coding matrixes prohibited from being used by the cooperating base station, particularly in the following operation A to operation B without any limitation thereto:

Operation A: the serving base station determines pre-coding matrixes requested for being prohibited from being used by the cooperating base station, and sends to the cooperating base station an indicator of the pre-coding matrixes requested for being prohibited from being used by the cooperating base station;

Herein, the serving base station may determine the pre-coding matrixes requested for being prohibited from being used by the cooperating base station, in a number of implementations, particularly as follows:

The serving base station determines a downlink transmission performance index of each UE served by the serving base station respectively, according to the CSI of the serving base station reported by the corresponding UE, searches the downlink transmission performance index of each UE for one or more downlink transmission performance indexes indicating the highest transmission performance, and determines a pre-coding matrix or pre-coding matrixes corresponding to a PMI or PMIs of the cooperating base station, and a pre-coding matrix or pre-coding matrixes in a relevance range or relevance ranges of the PMI or PMIs, as the pre-coding matrixes requested for being prohibited from being used by the cooperating base station, wherein the PMI or PMIs of the cooperating base station are reported by a CoMP UE or CoMP UEs corresponding to the found downlink transmission performance index or indexes. Here the downlink transmission performance index may include a throughput, a fairness weight or other data capable of reflecting downlink transmission performance; and the pre-coding matrix in the relevance range of the PMI refers to a pre-coding matrix, with a relevance, lying in the relevance range, to the pre-coding matrix corresponding to the PMI, for example, the relevance range may be a preset value, and a pre-coding matrix, with a relevance, no less or more than the preset value, to the pre-coding matrix corresponding to the PMI, may be determined as a pre-coding matrix in the relevance range of the PMI; and in another example, the relevance range may be a value interval, and a pre-coding matrix, with a relevance lying within or outside the value interval, may be determined as a pre-coding matrix in the relevance range of the PMI.

The serving base station may send to the cooperating base station the indicator of the pre-coding matrixes requested for being prohibited from being used by the cooperating base station, in a number of implementations, particularly as follows:

The serving base station sends at least one PMI, and information about relevance range of each of the at least one PMI to the cooperating base station, herein a pre-coding matrix corresponding to the at least one PMI, and a pre-coding matrix in the relevance range of each of the at least one PMI constitute the pre-coding matrixes requested by the serving base station for being prohibited from being used by the cooperating base station.

Operation B: the serving base station receives an indicator, sent by the cooperating base station, of the resulting pre-coding matrixes prohibited from being used by the cooperating base station, and determines the resulting pre-coding matrixes prohibited from being used by the cooperating base station, according to the indicator; and the resulting pre-coding matrixes prohibited from being used by the cooperating base station is determined by the cooperating base station as follows: the cooperating base station determines a set of candidate prohibited pre-coding matrixes according to the CSI reported by the UEs; determines a set of pre-coding matrixes requested by the serving base station for being prohibited from being used by the cooperating base station, according to an indicator, sent by the serving base station, of pre-coding matrixes requested for being prohibited from being used by the cooperating base station, and determines pre-coding matrixes in an intersection of the set of pre-coding matrixes requested by the serving base station for being prohibited from being used by the cooperating base station, and the set of candidate prohibited pre-coding matrixes as the resulting pre-coding matrixes prohibited from being used by the cooperating base station.

The indicator, sent by the cooperating base station, of the resulting pre-coding matrixes prohibited from being used by the cooperating base station may include but will not be limited to at least one PMI, and information about relevance range of each of the at least one PMI, herein a pre-coding matrix corresponding to the at least one PMI, and a pre-coding matrix in the relevance range of each PMI constitute the resulting pre-coding matrixes prohibited from being used by the cooperating base station; and correspondingly, the serving base station determines the resulting pre-coding matrixes prohibited from being used by the cooperating base station, according to the indicator particularly as follows: the serving base station determines the pre-coding matrix corresponding to the at least one PMI, and the pre-coding matrix in the relevance range of each PMI, as the resulting pre-coding matrixes prohibited from being used by the cooperating base station.

Particularly in the operation 31, the serving base station may perform resource scheduling, according to the received CSI, and the resulting pre-coding matrixes prohibited from being used by the cooperating base station in a number of implementations, particularly as follows:

The serving base station determines interference to downlink transmission of the UEs served by the serving base station, according to the resulting pre-coding matrixes prohibited from being used by the cooperating base station, herein the interference does not contain interference generated when the resulting pre-coding matrixes prohibited from being used by the cooperating base station are used by the cooperating base station; and The serving base station schedules resources for the UEs served by the serving base station, according to the interference to downlink transmission of the UEs served by the serving base station, and the received CSI.

Further to any of embodiments of the method, after the serving base station performs resource scheduling, the serving base station may inform the cooperating base station whether the cooperating base station is allowed to use the resulting pre-coding matrixes prohibited from being used by the cooperating base station over the scheduling resources, according to the result of scheduling the resources in a number of implementations, particularly as follows:

If the serving base station does not schedule any CoMP UE over the scheduling resources, then the serving base station informs the cooperating base station that the cooperating base station is allowed to use the resulting pre-coding matrixes prohibited from being used by the cooperating base station over the scheduling resources; and if the serving base station has scheduled a CoMP UE over the scheduling resources, then the serving base station informs the cooperating base station, that the cooperating base station is not allowed to use the resulting pre-coding matrixes prohibited from being used by the cooperating base station over the scheduling resources, or does not inform the cooperating base station that the cooperating base station is allowed to use the resulting pre-coding matrixes prohibited from being used by the cooperating base station over the scheduling resources.

Figure 4:
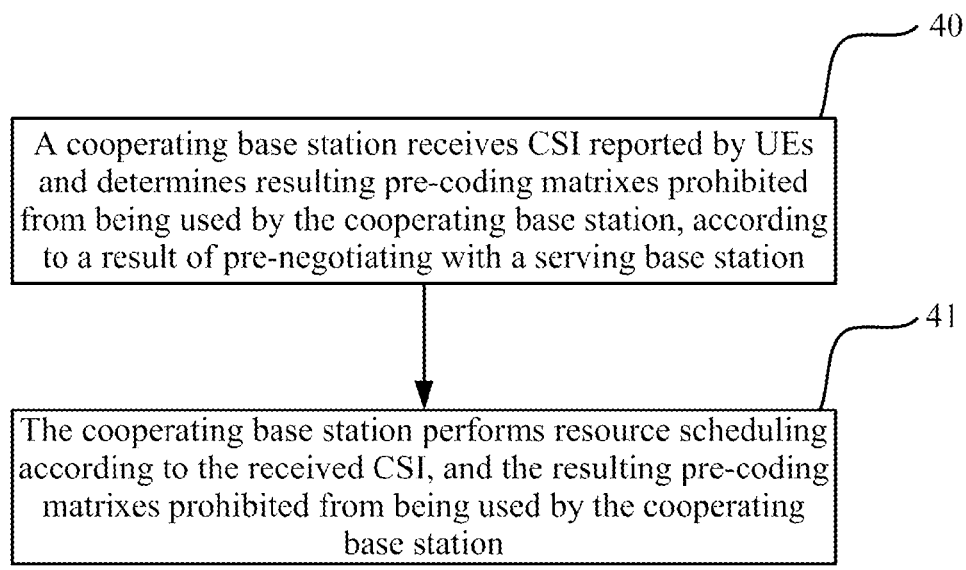
FIG. 4 illustrates a schematic flow chart of another method according to an embodiment of the present disclosure.

Referring to FIG. 4, an embodiment of the present disclosure provides a method for scheduling resources in CoMP transmission, the method includes the following operations:

Operation 40: A cooperating base station receives CSI reported by UEs and determines resulting pre-coding matrixes prohibited from being used by the cooperating base station, according to a result of pre-negotiating with a serving base station, and the CSI reported by the UEs may include one or any combination of a PMI, an RI and a CQI; and Operation 41: The cooperating base station performs resource scheduling according to the received CSI, and the resulting pre-coding matrixes prohibited from being used by the cooperating base station.

Data may be transmitted to the UE according to a result of resource scheduling, after resource scheduling is performed in the flow illustrated in FIG. 4.

Before the operation 40, the cooperating base station may pre-negotiate with the serving base station about the resulting pre-coding matrixes prohibited from being used by the cooperating base station, in a number of implementations, particularly in the following operation C to operation D:

C. The cooperating base station determines a set of candidate prohibited pre-coding matrixes according to the CSI reported by the UEs;

Here the cooperating base station may determine the set of candidate prohibited pre-coding matrixes according to the CSI reported by the UEs, in a number of implementations, particularly as follows:

The cooperating base station determines a downlink transmission performance index of each UE served by the cooperating base station respectively, according to the CSI of the cooperating base station reported by the corresponding UE; and The cooperating base station searches the downlink transmission performance indexes of the respective UEs, for one or more downlink transmission performance indexes indicating the lowest transmission performance, and determines a set including a pre-coding matrix or pre-coding matrixes corresponding to a PMI or PMIs of the cooperating base station, and a pre-coding matrix or pre-coding matrixes in a relevance range or relevance ranges of the PMI or PMIs, as the set of candidate prohibited pre-coding matrixes, wherein the PMI or PMIs of the cooperating base station are reported by the UE or UEs corresponding to the found downlink transmission performance index or indexes; or searches the downlink transmission performance indexes of the respective UEs, for one or more downlink transmission performance indexes indicating the highest transmission performance, and determines a pre-coding matrix or pre-coding matrixes corresponding to a PMI or PMIs of the cooperating base station, and a pre-coding matrix or pre-coding matrixes in a relevance range or relevance ranges of the PMI or PMIs, as pre-coding matrixes which are not allowed to be prohibited, wherein the PMI or PMIs of the cooperating base station are reported by the UE or UEs corresponding to the found downlink transmission performance index or indexes, and determines a set including the other pre-coding matrixes than the pre-coding matrixes which are not allowed to be prohibited, as the set of candidate prohibited pre-coding matrixes. Here the downlink transmission performance index may include a throughput, a fairness weight or other data capable of reflecting downlink transmission performance; the pre-coding matrix in the relevance range of the PMI refers to a pre-coding matrix, with a relevance lying in the relevance range to the pre-coding matrix corresponding to the PMI, for example, the relevance range may be a preset value, and a pre-coding matrix, with a relevance, no less or more than the preset value, to the pre-coding matrix corresponding to the PMI, may be determined as a pre-coding matrix in the relevance range of the PMI; and in another example, the relevance range may be a value interval, and a pre-coding matrix, with a relevance, lying within or outside the value interval, may be determined as a pre-coding matrix in the relevance range of the PMI.

D. The cooperating base station receives an indicator, sent by the serving base station, of pre-coding matrixes requested for being prohibited from being used by the cooperating base station, determines a set of pre-coding matrixes requested by the serving base station for being prohibited from being used by the cooperating base station, according to the indicator; determines pre-coding matrixes in an intersection of the set of pre-coding matrixes requested by the serving base station for being prohibited from being used by the cooperating base station, and the set of candidate prohibited pre-coding matrixes, as the resulting pre-coding matrixes prohibited from being used by the cooperating base station; and sends an indicator of the resulting pre-coding matrixes prohibited from being used by the cooperating base station to the serving base station.

Here the indicator, sent by the serving base station, of the pre-coding matrixes requested for being prohibited from being used by the cooperating base station may include at least one PMI, and information about relevance range of each of the at least one PMI, herein the pre-coding matrix corresponding to the at least one PMI, and a pre-coding matrix in the relevance range of each PMI constitute the pre-coding matrixes requested by the serving base station for being prohibited from being used by the cooperating base station; and correspondingly, the cooperating base station determines the set of pre-coding matrixes requested by the serving base station for being prohibited from being used by the cooperating base station, according to the indicator particularly as follows: the cooperating base station determines a set including the pre-coding matrix corresponding to the at least one PMI, and the pre-coding matrix in the relevance range of each PMI, as the set of pre-coding matrixes requested by the serving base station for being prohibited from being used by the cooperating base station.

The cooperating base station may send the indicator of the resulting pre-coding matrixes prohibited from being used by the cooperating base station to the serving base station, in a number of implementations, particularly as follows: the cooperating base station sends at least one PMI, and information about relevance range of each of the at least one PMI to the cooperating base station, herein a pre-coding matrix corresponding to the at least one PMI, and a pre-coding matrix in the relevance range of each PMI constitute the resulting pre-coding matrixes prohibited from being used by the cooperating base station.

The cooperating base station may perform resource scheduling, according to the received CSI, and the resulting pre-coding matrixes prohibited from being used by the cooperating base station in the operation 41, in a number of implementations, particularly as follows:

The cooperating base station determines whether any notification, transmitted by the serving base station and the other respective cooperating base stations, indicating that the cooperating base station is allowed to use the resulting pre-coding matrixes prohibited from being used by the cooperating base station over the scheduling resources, has been received; and if the notification has been received, then the cooperating base station performs resource scheduling according to the CSI reported by the UEs, that is, performs resource scheduling as in the prior art; if the notification has not been received, the cooperating base station performs resource scheduling, according to the CSI reported by the UEs, and the resulting pre-coding matrixes prohibited from being used by the cooperating base station, and particularly, the cooperating base station does not use the resulting pre-coding matrixes prohibited from being used, to schedule any resources, and the cooperating base station does not use the resulting pre-coding matrixes prohibited from being used, for downlink transmission, that is, the cooperating base station performs resource scheduling, according to the CIS reported by the UEs, by using the other pre-coding matrixes than the resulting pre-coding matrixes prohibited from being used by the cooperating base station.

Figure 5A:
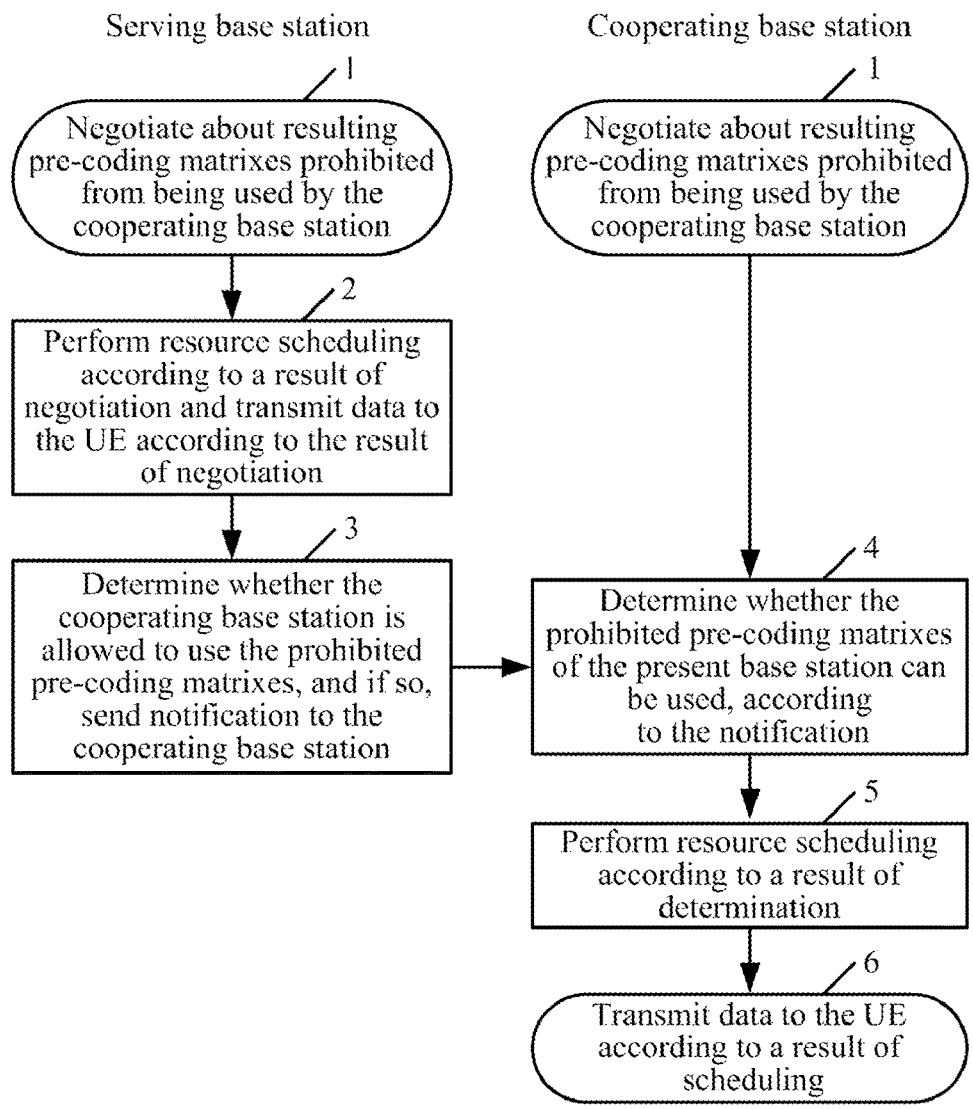
FIG. 5A illustrates a schematic flow chart according to a first embodiment of the present disclosure.
Figure 5B:
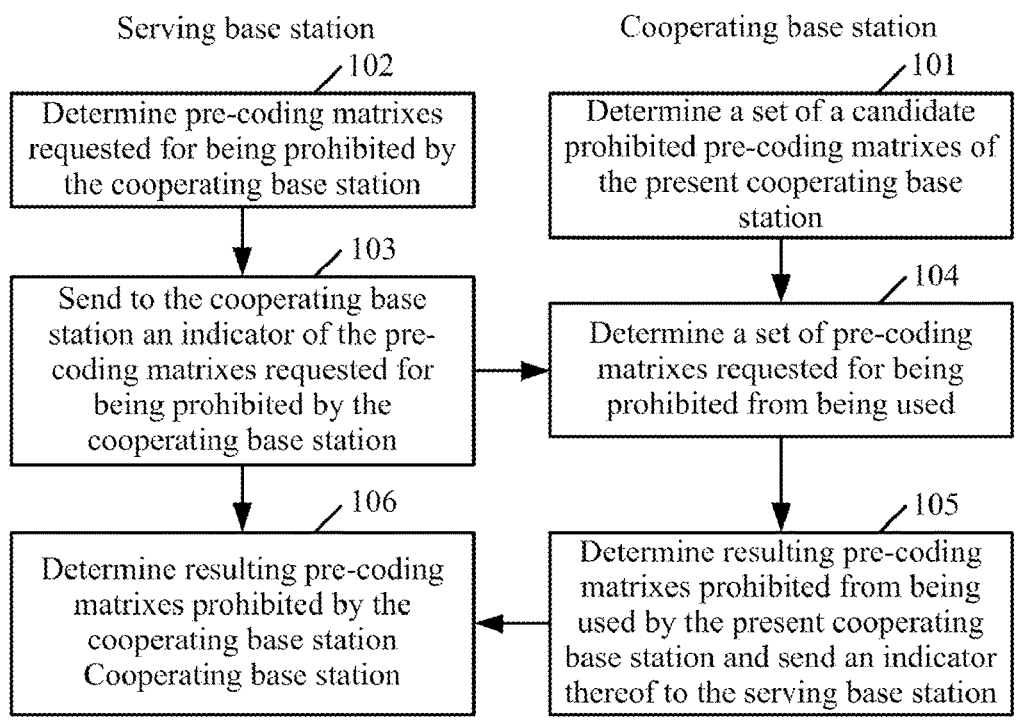
FIG. 5B illustrates a schematic flow chart according to a second embodiment of the present disclosure.

An interaction flow between the present serving base station and the cooperating base station will be described below in details as illustrated in FIG. 5A:

Operation 1: The serving base station receives CSI reported by UEs served by the serving base station, and negotiates with the cooperating base station about pre-coding matrixes which can be used and/or which are prohibited from being used by the cooperating base station. The CSI reported by the CoMP UEs at least includes PMI information of the cooperating base station, and PMI/RI and CQI information of the serving base station. Herein the CoMP UEs refer to UEs to which a plurality of base stations cooperate in transmitting. As illustrated in FIG. 5B, the serving base station may negotiate with the cooperating base station about resulting pre-coding matrixes prohibited from being used by the cooperating base station in the following operations 101 to 106:

Operation 101: The cooperating base station determines a set of candidate prohibited pre-coding matrixes, and particularly the cooperating base station determines a downlink transmission performance index (e.g. throughput) of each UE served by the cooperating base station respectively according to CSI (e.g., PMI/RI and CQI information) of the cooperating base station reported by the corresponding UE; and searches the downlink transmission performance indexes of the respective UEs, for one or more downlink transmission performance indexes indicating the lowest transmission performance, and determines a set including a pre-coding matrix or pre-coding matrixes corresponding to a PMI or PMIs of the cooperating base station, and a pre-coding matrix or pre-coding matrixes in a relevance range or relevance ranges of the PMI or PMIs as the set of candidate prohibited pre-coding matrixes, wherein the PMI or PMIs of the cooperating base station are reported by the UE or UEs corresponding to the found downlink transmission performance index or indexes; or searches the downlink transmission performance indexes of the respective UEs for one or more downlink transmission performance indexes indicating the highest transmission performance, and determines a pre-coding matrix or pre-coding matrixes corresponding to a PMI or PMIs of the cooperating base station, and a pre-coding matrix or pre-coding matrixes in a relevance range or relevance ranges of the PMI or PMIs, as pre-coding matrixes which are not allowed to be prohibited, wherein the PMI or PMIs of the cooperating base station are reported by the UE or UEs corresponding to the found downlink transmission performance index or indexes, and determines a set including the other pre-coding matrixes than the pre-coding matrixes which are not allowed to be prohibited, as the set of candidate prohibited pre-coding matrixes.

Operation 102: The serving base station determines pre-coding matrixes requested for being prohibited from being used by the cooperating base station, and particularly the serving base station determines a downlink transmission performance index (e.g. throughput) of each UE served by the serving base station respectively, according to the CSI (e.g., PMI/RI and CQI information) of the serving base station reported by the corresponding UE, searches the downlink transmission performance indexes of the respective UEs, for one or more downlink transmission performance indexes indicating the highest transmission performance, and determines a pre-coding matrix or pre-coding matrixes corresponding to a PMI or PMIs of the cooperating base station, and a pre-coding matrix or pre-coding matrixes in a relevance range or relevance ranges of the PMI or PMIs, as the pre-coding matrixes requested for being prohibited from being used by the cooperating base station, wherein the PMI or PMIs of the cooperating base station are reported by a CoMP UE or UEs corresponding to the found downlink transmission performance index or indexes.

Operation 103: The serving base station sends to the cooperating base station an indicator of the pre-coding matrixes requested for being prohibited from being used by the cooperating base station. For example, the indicator includes at least one PMI, and information about relevance range of each of the at least one PMI, and a pre-coding matrix corresponding to the at least one PMI, and a pre-coding matrix in the relevance range of each PMI constitute the pre-coding matrixes requested by the serving base station for being prohibited from being used by the cooperating base station.

Operation 104: The cooperating base station receives the indicator, sent by the serving base station, of the pre-coding matrixes requested for being prohibited from being used by the cooperating base station, and determines a set of pre-coding matrixes requested by the serving base station for being prohibited from being used by the cooperating base station according to the indicator, and particularly the cooperating base station determines a set including the pre-coding matrix corresponding to the at least one PMI in the indicator, and the a pre-coding matrix in the relevance range of each PMI, as the set of pre-coding matrixes requested by the serving base station for being prohibited from being used by the cooperating base station.

Operation 105: The cooperating base station determines the resulting pre-coding matrixes prohibited from being used by the cooperating base station, and particularly, the cooperating base station determines pre-coding matrixes in an intersection of the set of pre-coding matrixes prohibited from being used by the cooperating base station, determined in the operation 104, and the set of candidate prohibited pre-coding matrixes, determined in the operation 101, as the resulting pre-coding matrixes prohibited from being used by the cooperating base station.

The cooperating base station sends an indicator of the resulting pre-coding matrixes prohibited from being used by the cooperating base station to the serving base station. For example, the indicator includes at least one PMI, and information about relevance range of each of the at least one PMI; and a pre-coding matrix corresponding to the at least one PMI, and a pre-coding matrix in the relevance range of each PMI constitute the resulting pre-coding matrixes prohibited from being used by the cooperating base station.

Operation 106: The serving base station receives the indicator, sent by the cooperating base station, of the resulting pre-coding matrixes prohibited from being used by the cooperating base station, and determines and records the resulting pre-coding matrixes prohibited from being used by the cooperating base station according to the indicator, to thereby perform resource scheduling according to the recorded resulting pre-coding matrixes prohibited from being used by the cooperating base station in subsequent resource scheduling.

The serving base station may negotiate with the cooperating base station about the pre-coding matrixes prohibited from being used in the operations above uniformly for the entire transmission bandwidth, so that the result of negotiation is valid to the entire bandwidth; or they may negotiate separately for each scheduling resource, so that the result of negotiation on each scheduling resource is valid only to the scheduling resource.

Relative to resource scheduling by the base stations, the serving base station may semi-statically negotiate with the cooperating base station about the pre-coding matrixes prohibited from being used, and need to perform the above negotiation procedure every time before resource scheduling, and a result of negotiation between the base stations will be valid for a period of time until a new result of negotiation is generated in next negotiation between the base stations.

Operation 2: The serving base station receives CSI reported by UEs served by the serving base station, performs resource scheduling according to the received CSI, and the resulting pre-coding matrixes prohibited from being used by the cooperating base station, recorded in the operation 1, and transmits data to the UE according to a result of resource scheduling. Here resource scheduling is performed as follows: if the cooperating base station does not use the pre-coding matrixes prohibited from being used by the cooperating base station over resources, then serving base station schedules the resources, and calculates pre-coding matrixes, for the UEs, and particularly the serving base station determines interference to downlink transmission of the UEs served by the serving base station, according to the resulting pre-coding matrixes prohibited from being used by the cooperating base station, herein the interference does not contain interference generated when the resulting pre-coding matrixes prohibited from being used by the cooperating base station are used by the cooperating base station; and schedules resources for the UEs served by the serving base station, according to the interference to downlink transmission of the UEs served by the serving base station, and the received CSI.

Operation 3: The serving base station informs the cooperating base station whether the cooperating base station is allowed to use the resulting pre-coding matrixes prohibited from being used by the cooperating base station over each scheduling resource, according to the result of scheduling the scheduling resource. Particularly if the serving base station does not schedule any CoMP UE over a scheduling resource, then the serving base station informs the cooperating base station that the cooperating base station is allowed to use the resulting pre-coding matrixes prohibited from being used by the cooperating base station over the scheduling resource; otherwise, the serving base station does inform the cooperating base station that the cooperating base station is allowed to use the resulting pre-coding matrixes prohibited from being used by the cooperating base station over the scheduling resource; and the notification that the cooperating base station is allowed to use the resulting pre-coding matrixes prohibited from being used by the cooperating base station over the scheduling resource, can be valid for a length of time prescribed by the serving base station with the cooperating base station, e.g., one or several sub-frames, and the period of time for which the notification is valid may be further transmitted to the cooperating base station in the form of the length of valid time, starting and ending points of valid time, etc., together with the notification, and the notification may be embodied in the form of a bitmap in which each bit corresponds to one of the scheduling resources, and the sequence of scheduling the resources in the bitmap is prescribed between the base stations, the serving base station sets bits, corresponding to scheduling resources over which the cooperating base station is allowed to use the pre-coding matrixes prohibited from being used, to be 1, and bits corresponding to the other scheduling resources to be 0; and the notification may further include directly sequence number of the scheduling resources over which the cooperating base station is allowed to use the pre-coding matrixes prohibited from being used;

Operation 4: The cooperating base station determines, for each scheduling resource, whether the resulting pre-coding matrixes prohibited from being used by the cooperating base station can be used over the corresponding scheduling resource, according to the received notification particularly as follows: with respect to a scheduling resource, if all the other cooperating base stations (including the serving base station) transmit, to the cooperating base station, a notification that the cooperating base station is allowed to use the pre-coding matrixes prohibited from being used by the cooperating base station over the scheduling resource, then it is determined that the resulting pre-coding matrixes prohibited from being used by the cooperating base station can be used over the scheduling resource; otherwise, it is determined that the resulting pre-coding matrixes prohibited from being used by the cooperating base station can not be used over the scheduling resource;

Operation 5: The cooperating base station performs resource scheduling, according to a result of the determination in the operation 4, in the period of time for which the notification is valid after making the determination in the operation 4. Particularly, if it is determined that the resulting pre-coding matrixes prohibited from being used by the cooperating base station can be used over a scheduling resource, then the cooperating base station performs resource scheduling according to the CSI reported by the UEs, that is, performs resource scheduling as in the prior art; otherwise, the cooperating base station performs resource scheduling, according to the CSI reported by the UEs, and the resulting pre-coding matrixes prohibited from being used by the cooperating base station, that is, the cooperating base station does not use the resulting pre-coding matrixes prohibited from being used, to schedule the resources, and does not use the resulting pre-coding matrixes prohibited from being used, in downlink transmission; and Operation 6: The cooperating base station transmits data to the UE according to a result of resource scheduling.

An embodiment of the scheme of distributed coordinated scheduling is as follows:

Firstly the system is assumed as follows:

There are two base stations in the system: a base station 1 and a base station 2 cooperate in CS/CB transmission;

The two base stations have two scheduling resources including a scheduling resource 1 and a scheduling resource 2;

The base station 1 serves two UEs, including a UE 1 and a UE 2, which may be scheduled over the two scheduling resources, herein the UE 1 is a CoMP UE, and the UE 2 is not a CoMP UE; and the base station 2 also serves two UE 2, including a UE 3 and a UE 4, herein the UE 3 is a CoMP UE, and the UE 4 is not a CoMP UE.

At this time a distributed CS/CB information exchange procedure over the network is as follows:

a. If the UE 1 reports that broadband PMIs of the base station 1 and the base station 2 respectively are PMI11 and PMI12; the UE 2 reports that a broadband PMI of the base station 1 is PMI21; the UE 3 reports that broadband PMIs of the base station 2 and the base station1 respectively are PMI32 and PMI31; and the UE 4 reports that a broadband PMI of the base station 2 is PMI42, then the base station 1 determines pre-coding matrixes with relevancies, no more than 0.5, to both the PMI11 and the PMI21, as candidate prohibited pre-coding matrixes of the base station1 in the entire bandwidth, and the base station 2 determines pre-coding matrixes with relevancies, no more than 0.5, to both the PMI32 and the PMI42, as candidate prohibited pre-coding matrixes of the base station2 in the entire bandwidth. The base station 1 determines the PMI of the base station 2 reported by the UEs 1, i.e., the PMI12, as a PMI requested for being prohibited by the base station 2 in the entire bandwidth; and the base station 2 determines the PMI of the base station 1 reported by the UEs 3, i.e., the PMI31, as a PMI requested for being prohibited by the base station 1 in the entire bandwidth.

b. The base station 1 notifies the base station 2 of the PMI requested for being prohibited by the base station 2 in the entire bandwidth, i.e., the PMI12, and the base station 2 notifies the base station 1 of the PMI requested for being prohibited by the base station 1 in the entire bandwidth, i.e., the PMI31. The base station 1 receives the PMI31, determines pre-coding matrixes with relevancies, no less than 0.5, to the PMI31, as a set of pre-coding matrixes requested by the base station 2 for being prohibited, and determines an intersection of the set of pre-coding matrixes requested by the base station 2 for being prohibited, and the set of candidate prohibited pre-coding matrixes of the base station 1, obtained in the operation a as a set of pre-coding matrixes prohibited from being used, herein the set includes all of pre-coding matrixes with relevancies, no less than 0.8, to a $PMI_\alpha$. The base station 1 notifies the base station 2 of the $PMI_\alpha$ and the relevancy of "0.8", and the base station 2 records a set of pre-coding matrixes prohibited from being used by the base station as all the pre-coding matrixes with relevancies, no less than 0.8, to the $PMI_\alpha$. Similarly, the base station 2 determines all of pre-coding matrixes with relevancies, no less than 0.9, to a $PMI_\beta$, as pre-coding matrixes prohibited from being used by the present base station, and informs the base station 1 the pre-coding matrixes prohibited from being used.

c. The UEs 1 and 2 reports CSI information to the base station, and the base station 1 performs resource scheduling, and calculates pre-coding matrixes, for the UEs according to the reported CSI. When the base station 1 performs resource scheduling, it is assumed that the base station 2 does not use the pre-coding matrixes prohibited from being used by the base station 2, and the UEs of the base station 1 do not use the pre-coding matrixes prohibited from being used by the base station 1. It is assumed that the base station 1 schedules the UE 1 over the scheduling resource 1 using a pre-coding matrix $W_{11}$, and $W_{11}$ does not belong to the set of pre-coding matrixes prohibited from being used by the base station 1, and the base station 1 schedules the UE 2 over the scheduling resource 2 using a pre-coding matrix $W_{22}$, and $W_{22}$ does not belong to the set of pre-coding matrixes prohibited from being used by the base station 1; and the base station 2 schedules the UE 3 over the scheduling resource 1 using a pre-coding matrix $W_{31}$, and $W_{31}$ does not belong to the set of pre-coding matrixes prohibited from being used by the base station 2, and the base station 1 schedules the UE 4 over the scheduling resource 2 using a pre-coding matrix $W_{42}$, and $W_{42}$ does not belong to the set of pre-coding matrixes prohibited from being used by the base station 2, as depicted In Table 1 below.

TABLE 1

|  | Scheduling resource 1 | | Scheduling resource 2 | |
| --- | --- | --- | --- | --- |
|  | base station 1 | base station 2 | base station 1 | base station 2 |
| Pre-scheduled UE | UE 1 | UE 3 | UE 2 | UE 4 |
| Pre-coding matrix | $W_{11}$ | $W_{31}$ | $W_{22}$ | $W_{42}$ | d. The base station 1 does not schedule any CoMP UE over the scheduling resource 2, and the base station 1 notifies the base station 2 of a resource sequence-number 2 and an allowed duration 1, to indicate that the base station 2 can use the pre-coding matrixes prohibited from being used over the scheduling resource 2 in one sub-frame; and the base station 2 does not schedule any CoMP UE over the scheduling resource 2 either, and the base station 2 notifies the base station 1 of the resource sequence-number 2 and an allowed duration 2, to indicate that the base station 1 can use the pre-coding matrixes prohibited from being used over the scheduling resource 2 in two sub-frames.

e. The base station 1 receives the notification, transmitted by the base station 2, that the pre-coding matrixes prohibited from being used can be used over the scheduling resource 2, and performs resource scheduling, and calculates pre-coding matrixes, again on the scheduling resource 2, and schedules the UE 2 and the UE 1 over the schedules after performing scheduling again, herein the pre-coding matrix of the UE 2 is $W'_{22}$, and $W'_{22}$ belongs to the set of pre-coding matrixes prohibited from being used by the base station 1, recorded by the present base station, and the pre-coding matrix of the UE 1 is $W_{12}$. The base station receives the notification, transmitted by the base station 1, that the pre-coding matrixes prohibited from being used can be used by the base station 2, but does not perform resource scheduling again, as depicted in Table 2.

TABLE 2

|  | Scheduling resource 1 | | Scheduling resource 2 | |
| --- | --- | --- | --- | --- |
|  | base station 1 | base station 2 | base station 1 | base station 2 |
| Pre-scheduled UE | UE 1 | UE 3 | UE 2  UE 1 | UE 4 |
| Pre-coding matrix | $W_{11}$ | $W_{31}$ | $W_{22}'$  $W_{12}$ | $W_{42}$ |

Figure 6:
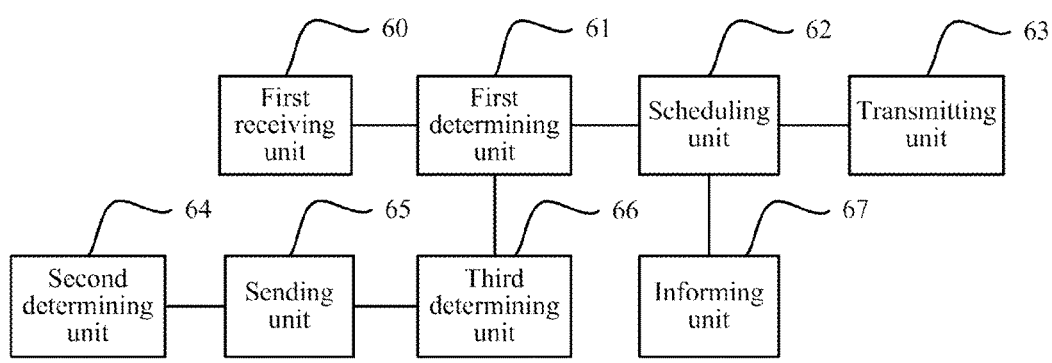
FIG. 6 illustrates a schematic diagram of a serving base station according to an embodiment of the present disclosure.

Referring to FIG. 6, an embodiment of the present disclosure provides a serving base station including:

A first receiving unit 60 is configured to receive Channel State Information (CSI) reported by UEs;

A first determining unit 61 is configured to determine resulting pre-coding matrixes prohibited from being used by a cooperating base station, according to a result of pre-negotiation with the cooperating base station;

A scheduling unit 62 is configured to perform resource scheduling according to the received CSI, and the resulting pre-coding matrixes prohibited from being used; and A transmitting unit 63 is configured to transmit data to the UE according to a result of resource scheduling.

Furthermore the serving base station further includes:

A second determining unit 64 is configured to determine pre-coding matrixes requested for being prohibited from being used by the cooperating base station;

A sending unit 65 is configured to send to the cooperating base station an indicator of the pre-coding matrixes requested for being prohibited from being used by the cooperating base station; and A third determining unit 66 is configured to receive an indicator, sent by the cooperating base station, of the resulting pre-coding matrixes prohibited from being used by the cooperating base station, and to determine the resulting pre-coding matrixes prohibited from being used by the cooperating base station, according to the indicator.

Furthermore the second determining unit 64 is configured:

To determine a downlink transmission performance index of each UE served by the serving base station respectively according to the CSI of the serving base station reported by the corresponding UE, to search the downlink transmission performance indexes of the respective UEs for one or more downlink transmission performance indexes indicating the highest transmission performance, and to determine a pre-coding matrix or pre-coding matrixes corresponding to a PMI or PMIs of the cooperating base station, and a pre-coding matrix or pre-coding matrixes in a relevance range or relevance ranges of the PMI or PMIs, as the pre-coding matrixes requested for being prohibited from being used by the cooperating base station, wherein the PMI or PMIs of the cooperating base station are reported by a CoMP UE or UEs corresponding to the found downlink transmission performance index or indexes.

Furthermore the sending unit 65 is configured:

To send at least one PMI, and information about relevance range of each of the at least one PMI to the cooperating base station, where a pre-coding matrix corresponding to the at least one PMI, and a pre-coding matrix in the relevance range of each PMI constitute the pre-coding matrixes requested by the serving base station for being prohibited from being used by the cooperating base station.

Furthermore the third determining unit 66 is configured:

To receive the indicator, sent by the cooperating base station, of the resulting pre-coding matrixes prohibited from being used by the cooperating base station, where the indicator includes at least one PMI, and information about relevance range of each of the at least one PMI to the cooperating base station; and a pre-coding matrix corresponding to the at least one PMI, and a pre-coding matrix in the relevance range of each PMI constitute the resulting pre-coding matrixes prohibited from being used by the cooperating base station; and To determine the pre-coding matrix corresponding to the at least one PMI, and the pre-coding matrix in the relevance range of each PMI, as the resulting pre-coding matrixes prohibited from being used by the cooperating base station.

Furthermore the scheduling unit 62 is configured:

To determine interference to downlink transmission of the UEs served by the serving base station, according to the resulting pre-coding matrixes prohibited from being used by the cooperating base station, herein the interference does not contain interference generated when the resulting pre-coding matrixes prohibited from being used by the cooperating base station are used by the cooperating base station; and To schedule resources for the UEs served by the serving base station, according to the interference to downlink transmission of the UEs served by the serving base station, and the received CSI.

Furthermore the serving base station further includes:

A informing unit 67 is configured to inform the cooperating base station, whether the cooperating base station is allowed to use the resulting pre-coding matrixes prohibited from being used by the cooperating base station over a scheduling resource, according to the result of scheduling the resource after resource scheduling is performed.

Furthermore the informing unit is configured:

After resource scheduling is performed, if there is not any CoMP UE over the scheduling resource, to inform the cooperating base station that the cooperating base station is allowed to use the resulting pre-coding matrixes prohibited from being used by the cooperating base station over the scheduling resource; otherwise, to inform the cooperating base station that the cooperating base station is not allowed to use the resulting pre-coding matrixes prohibited from being used by the cooperating base station over the scheduling resource; or not to inform the cooperating base station that the cooperating base station is allowed to use the resulting pre-coding matrixes prohibited from being used by the cooperating base station over the scheduling resource.

Based upon the same inventive idea as the method, an embodiment of the present disclosure further provides a serving base station including a radio frequency unit and a processor, where:

The radio frequency unit is configured to receive CSI reported by each UE; and

The processor is configured to determine resulting pre-coding matrixes prohibited from being used by a cooperating base station, according to a result of pre-negotiation with the cooperating base station; and to perform resource scheduling according to the received CSI, and the resulting pre-coding matrixes prohibited from being used.

In this solution, the serving base station pre-negotiates with the cooperating base station about the resulting pre-coding matrixes prohibited from being used by the cooperating base station, to thereby perform subsequent resource scheduling according to the result of negotiation, without exchanging information between the serving base station and the cooperating base station every time before resource scheduling is performed, to thereby lower a transmission delay via an X2 interface between the serving base station and the cooperating base station, and thus improve the efficiency of scheduling.

Figure 7:
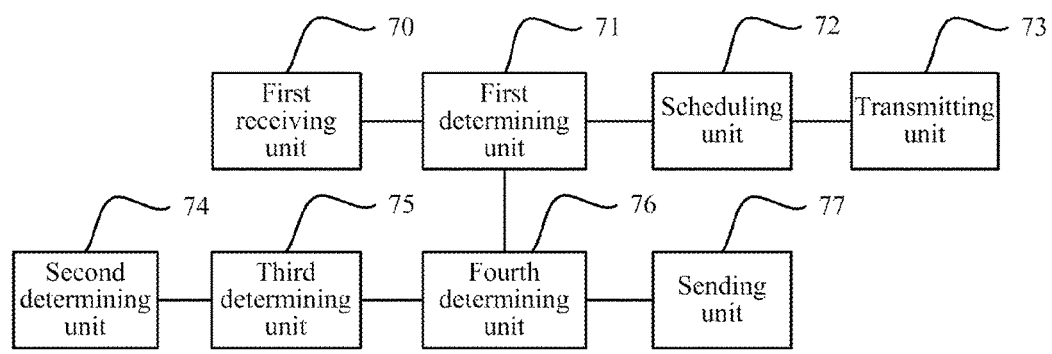
FIG. 7 illustrates a schematic diagram of a cooperating base station according to an embodiment of the present disclosure.

Referring to FIG. 7, an embodiment of the present disclosure provides a cooperating base station including:

A receiving unit 70 is configured to receive CSI reported by each UE;

A first determining unit 71 is configured to determine resulting pre-coding matrixes prohibited from being used by the cooperating base station, according to a result of pre-negotiating with a serving base station;

A scheduling unit 72 is configured to perform resource scheduling according to the received CSI, and the resulting pre-coding matrixes prohibited from being used by the cooperating base station; and A transmitting unit 73 is configured to transmit data to the UE according to a result of resource scheduling.

Furthermore the cooperating base station further includes:

A second determining unit 74 is configured to determine a set of candidate prohibited pre-coding matrixes according to the CSI reported by the UEs;

A third determining unit 75 is configured to receive an indicator, sent by the serving base station, of pre-coding matrixes requested for being prohibited from being used by the cooperating base station; and to determine a set of pre-coding matrixes requested by the serving base station for being prohibited from being used by the cooperating base station, according to the indicator;

A fourth determining unit 76 is configured to determine pre-coding matrixes in an intersection of the set of pre-coding matrixes requested by the serving base station for being prohibited from being used by the cooperating base station, and the set of candidate prohibited pre-coding matrixes as the resulting pre-coding matrixes prohibited from being used by the cooperating base station; and A sending unit 77 is configured to send an indicator of the resulting pre-coding matrixes prohibited from being used by the cooperating base station to the serving base station.

Furthermore the third determining unit 75 is configured:

To receive the indicator, sent by the serving base station, of the pre-coding matrixes requested for being prohibited from being used by the cooperating base station, wherein the indicator includes at least one PMI, and information about relevance range of each of the at least one PMI to the cooperating base station, and a pre-coding matrix corresponding to the at least one PMI, and a pre-coding matrix in the relevance range of each PMI constitute the pre-coding matrixes requested by the serving base station for being prohibited from being used by the cooperating base station; and To determine a set including the pre-coding matrix corresponding to the at least one PMI, and the a pre-coding matrix in the relevance range of each PMI as the set of pre-coding matrixes requested by the serving base station for being prohibited from being used by the cooperating base station.

Furthermore the second determining unit 74 is configured:

To determine a set of candidate prohibited pre-coding matrixes, and particularly the cooperating base station determines a downlink transmission performance index of each UE served by the cooperating base station respectively according to the CSI of the cooperating base station reported by the corresponding UE; and To search the downlink transmission performance indexes of the respective UEs for one or more downlink transmission performance indexes indicating the lowest transmission performance, and to determine a set including a pre-coding matrix or pre-coding matrixes corresponding to a PMI or PMIs of the cooperating base station, and a pre-coding matrix or pre-coding matrixes in a relevance range or relevance ranges of the PMI or PMIs as the set of candidate prohibited pre-coding matrixes, wherein the PMI or PMIs of the cooperating base station are reported by the UE or UEs corresponding to the found downlink transmission performance index or indexes; or to search the downlink transmission performance indexes of the respective UEs for one or more downlink transmission performance indexes indicating the highest transmission performance, and to determine a pre-coding matrix or pre-coding matrixes corresponding to a PMI or PMIs of the cooperating base station, and a pre-coding matrix or pre-coding matrixes in a relevance range or relevance ranges of the PMI or PMIs as pre-coding matrixes which are not allowed to be prohibited, wherein the PMI or PMIs of the cooperating base station are reported by the UE or UEs corresponding to the found downlink transmission performance index or indexes, and to determine a set including the other pre-coding matrixes than the pre-coding matrixes which are not allowed to be prohibited, as the set of candidate prohibited pre-coding matrixes.

Furthermore the sending unit 77 is configured:

To send at least one PMI, and information about relevance range of each of the at least one PMI to the serving base station, where a pre-coding matrix corresponding to the at least one PMI, and a pre-coding matrix in the relevance range of each PMI constitute the resulting pre-coding matrixes prohibited from being used by the cooperating base station.

Furthermore the scheduling unit 72 is configured:

To determine whether any notification, transmitted by the serving base station and the other respective cooperating base stations, indicating that the cooperating base station is allowed to use the resulting pre-coding matrixes prohibited from being used by the cooperating base station over a scheduling resource, has been received; and if the notification has been received, to perform resource scheduling according to the CSI reported by the UEs; otherwise, to perform resource scheduling according to the CSI reported by the UEs, and the resulting pre-coding matrixes prohibited from being used by the cooperating base station.

Based upon the same inventive idea as the method, an embodiment of the present disclosure further provides a cooperating base station including a radio frequency unit and a processor, where:

The radio frequency unit is configured to receive CSI reported by each UE; and

The processor is configured to determine resulting pre-coding matrixes prohibited from being used by the cooperating base station, according to a result of pre-negotiating with a serving base station; and to perform resource scheduling according to the received CSI, and the resulting pre-coding matrixes prohibited from being used by the cooperating base station.

In this solution, the serving base station pre-negotiates with the cooperating base station about the resulting pre-coding matrixes prohibited from being used by the cooperating base station, to thereby perform subsequent resource scheduling according to the result of negotiation, without exchanging information between the serving base station and the cooperating base station every time before resource scheduling is performed, to thereby lower a transmission delay via an X2 interface between the serving base station and the cooperating base station, and thus improve the efficiency of scheduling.

In summary, advantageous effects of the present disclosure are as follows:

In the solutions according to the embodiments of the present disclosure, the serving base station receives CCSI reported by each UE, determines resulting pre-coding matrixes prohibited from being used by a cooperating base station, according to a result of pre-negotiation with the cooperating base station, performs resource scheduling according to the received CSI, and the resulting pre-coding matrixes prohibited from being used by the cooperating base station, and transmits data to the UE according to a result of resource scheduling; and the cooperating base station receives CSI reported by each UE, determines the resulting pre-coding matrixes prohibited from being used by the cooperating base station, according to the result of pre-negotiating with the serving base station, performs resource scheduling according to the received CSI, and the resulting pre-coding matrixes prohibited from being used by the cooperating base station, and transmits data to the UE according to a result of resource scheduling. Apparently in the solutions, the serving base station pre-negotiates with the cooperating base station about the resulting pre-coding matrixes prohibited from being used by the cooperating base station, to thereby perform subsequent resource scheduling according to the result of negotiation without exchanging information between the serving base station and the cooperating base station every time before resource scheduling is performed, to thereby lower a transmission delay via an X2 interface between the serving base station and the cooperating base station, thus, improve the efficiency of scheduling.

The present disclosure has been described in a flow chart and/or a block diagram of the method, the device (system) and the computer program product according to the embodiments of the present disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the present disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the present disclosure.

Evidently those skilled in the art can make various modifications and variations to the present disclosure without departing from the spirit and scope of the present disclosure. Thus the present disclosure is also intended to encompass these modifications and variations thereto so long as the modifications and variations come into the scope of the claims appended to the present disclosure and their equivalents.

The invention claimed is:

1. A method for scheduling resources in Coordinated Multi-Point, CoMP, transmission, the method comprising:
receiving, by a serving base station, Channel State Information, CSI, reported by UEs, and determining resulting pre-coding matrixes prohibited from being used by a cooperating base station, according to a result of pre-negotiation with the cooperating base station; and
performing, by the serving base station, resource scheduling, according to the received CSI, and the resulting pre-coding matrixes prohibited from being used by the cooperating base station,
before the serving base station receives the CSI reported by the UEs, the method further comprises:
determining, by the serving base station, pre-coding matrixes requested for being prohibited from being used by the cooperating base station, and sending to the cooperating base station an indicator of the pre-coding matrixes requested for being prohibited from being used by the cooperating base station; and
receiving, by the serving base station, an indicator, sent by the cooperating base station, of the resulting pre-coding matrixes prohibited from being used by the cooperating base station, and determining the resulting pre-coding matrixes prohibited from being used by the cooperating base station according to the indicator;
wherein the result of pre-negotiation can be used for multiple resource scheduling.

2. The method according to claim 1,
wherein the cooperating base station determines the resulting pre-coding matrixes prohibited from being used by the cooperating base station in such a way that:
the cooperating base station determines a set of candidate prohibited pre-coding matrixes according to CSI reported by the UEs; determines the set of pre-coding matrixes requested by the serving base station for being prohibited from being used by the cooperating base station according to the indicator, sent by the serving base station, of the pre-coding matrixes requested for being prohibited from being used by the cooperating base station; and determine pre-coding matrixes in an intersection of the set of pre-coding matrixes requested by the serving base station for being prohibited from being used by the cooperating base station, and the set of candidate prohibited pre-coding matrixes as the resulting pre-coding matrixes prohibited from being used by the cooperating base station.

3. The method according to claim 2, wherein sending, by the serving base station, to the cooperating base station the indicator of the pre-coding matrixes requested for being prohibited from being used by the cooperating base station, comprises:
sending, by the serving base station, at least one PMI, and information about relevance range of each of the at least one PMI to the cooperating base station, wherein a pre-coding matrix corresponding to the at least one PMI, and a pre-coding matrix in the relevance range of each PMI constitute the pre-coding matrixes requested by the serving base station for being prohibited from being used by the cooperating base station.

4. The method according to claim 2, wherein the indicator, transmitted by the cooperating base station, of the resulting pre-coding matrixes prohibited from being used by the cooperating base station comprises at least one PMI, and information about relevance range of each of the at least one PMI to the cooperating base station, wherein a pre-coding matrix corresponding to the at least one PMI, and a pre-coding matrix in the relevance range of each PMI constitute the resulting pre-coding matrixes prohibited from being used by the cooperating base station.

5. The method according to claim 1, wherein after the serving base station performs resource scheduling, the method further comprises:
informing, by the serving base station, to the cooperating base station whether the cooperating base station is allowed to use the resulting pre-coding matrixes prohibited from being used by the cooperating base station over a scheduling resource, according to a result of scheduling the resource.

6. The method according to claim 5, wherein informing, by the serving base station, to the cooperating base station whether the cooperating base station is allowed to use the resulting pre-coding matrixes prohibited from being used by the cooperating base station over the scheduling resource, according to the result of scheduling the resource, comprises:
if the serving base station does not schedule any CoMP UE over the scheduling resource, then informing the cooperating base station that the cooperating base station is allowed to use the resulting pre-coding matrixes prohibited from being used by the cooperating base station over the scheduling resource; and
if the serving base station schedules a CoMP UE over the scheduling resource, then informing the cooperating base station, that the cooperating base station is not allowed to use the resulting pre-coding matrixes prohibited from being used by the cooperating base station over the scheduling resource; or not informing the cooperating base station, that the cooperating base station is allowed to use the resulting pre-coding matrixes prohibited from being used by the cooperating base station over the scheduling resource.

7. A method for scheduling resources in Coordinated Multi-Point, CoMP, transmission, the method comprising:
receiving, by a cooperating base station, Channel State Information, CSI, reported by UEs, and determining resulting pre-coding matrixes prohibited from being used by the cooperating base station, according to a result of pre-negotiating with a serving base station;
performing, by the cooperating base station, resource scheduling according to the received CSI, and the resulting pre-coding matrixes prohibited from being used by the cooperating base station,
wherein before the cooperating base station receives the CSI reported by the UEs, the method further comprises:
determining, by the cooperating base station, a set of candidate prohibited pre-coding matrixes according to the CSI reported by the UEs; and
receiving, by the cooperating base station, an indicator, sent by the serving base station, of pre-coding matrixes requested for being prohibited from being used by the cooperating base station; determining a set of pre-coding matrixes requested by the serving base station for being prohibited from being used by the cooperating base station, according to the indicator; determining pre-coding matrixes in an intersection of the set of pre-coding matrixes requested by the serving base station for being prohibited from being used by the cooperating base station, and the set of candidate prohibited pre-coding matrixes as the resulting pre-coding matrixes prohibited from being used by the cooperating base station; and sending an indicator of the resulting pre-coding matrixes prohibited from being used by the cooperating base station to the serving base station;

wherein the result of pre-negotiation can be used for multiple resource scheduling.

8. The method according to claim 7, wherein the indicator, sent by the serving base station, of the pre-coding matrixes requested for being prohibited from being used by the cooperating base station comprises at least one PMI, and information about relevance range of each of the at least one PMI to the cooperating base station, and a pre-coding matrix corresponding to the at least one PMI, and a pre-coding matrix in the relevance range of each PMI constitute the pre-coding matrixes requested by the serving base station for being prohibited from being used by the cooperating base station.

9. The method according to claim 7, wherein sending, by the cooperating base station, the indicator of the resulting pre-coding matrixes prohibited from being used by the cooperating base station to the serving base station comprises:

sending, by the cooperating base station, at least one PMI, and information about relevance range of each of the at least one PMI to the serving base station, wherein a pre-coding matrix corresponding to the at least one PMI, and a pre-coding matrix in the relevance range of each PMI constitute the resulting pre-coding matrixes prohibited from being used by the cooperating base station.

10. A serving base station, comprising:
a receiver configured to receive Channel State Information, CSI, reported by UEs;
a processor configured to determine resulting pre-coding matrixes prohibited from being used by a cooperating base station, according to a result of pre-negotiation with the cooperating base station; and
perform resource scheduling according to the received CSI, and the resulting pre-coding matrixes prohibited from being used,
wherein the processor is further configured to determine pre-coding matrixes requested for being prohibited from being used by the cooperating base station;
the receiver is configured to send to the cooperating base station an indicator of the pre-coding matrixes requested for being prohibited from being used by the cooperating base station; and
the processor is further configured to receive an indicator, sent by the cooperating base station, of the resulting pre-coding matrixes prohibited from being used by the cooperating base station, and to determine the resulting pre-coding matrixes prohibited from being used by the cooperating base station according to the indicator;
wherein the result of pre-negotiation can be used for multiple resource scheduling.

11. The serving base station according to claim 10, wherein the cooperating base station determines the resulting pre-coding matrixes prohibited from being used by the cooperating base station by determining a set of candidate prohibited pre-coding matrixes according to CSI reported by each UE; determining the set of pre-coding matrixes requested by the serving base station for being prohibited from being used by the cooperating base station according to the indicator, sent by the serving base station, of the pre-coding matrixes requested for being prohibited from being used by the cooperating base station; and determining pre-coding matrixes in an intersection of the set of pre-coding matrixes requested by the serving base station for being prohibited from being used by the cooperating base station, and the set of candidate prohibited pre-coding matrixes as the resulting pre-coding matrixes prohibited from being used by the cooperating base station.

12. The serving base station according to claim 11, wherein the receiver is configured:
to send at least one PMI, and information about relevance range of each of the at least one PMI to the cooperating base station, wherein a pre-coding matrix corresponding to the at least one PMI, and a pre-coding matrix in the relevance range of each PMI constitute the pre-coding matrixes requested by the serving base station for being prohibited from being used by the cooperating base station.

13. The serving base station according to claim 11, wherein the processor is configured:
to receive the indicator, sent by the cooperating base station, of the resulting pre-coding matrixes prohibited from being used by the cooperating base station, wherein the indicator comprises at least one PMI, and information about relevance range of each of the at least one PMI to the cooperating base station, and a pre-coding matrix corresponding to the at least one PMI, and a pre-coding matrix in the relevance range of each PMI constitute the resulting pre-coding matrixes prohibited from being used by the cooperating base station.

14. The serving base station according to claim 10, wherein
the processor is configured to inform the cooperating base station whether the cooperating base station is allowed to use the resulting pre-coding matrixes prohibited from being used by the cooperating base station over a scheduling resource, according to the result of scheduling the resource after resource scheduling is performed.

15. The serving base station according to claim 14, wherein the processor is configured:
after resource scheduling is performed, if there is not any CoMP UE over the scheduling resource, to inform the cooperating base station that the cooperating base station is allowed to use the resulting pre-coding matrixes prohibited from being used by the cooperating base station over the scheduling resource; otherwise, to inform the cooperating base station that the cooperating base station is not allowed to use the resulting pre-coding matrixes prohibited from being used by the cooperating base station over the scheduling resource; or not to inform the cooperating base station that the cooperating base station is allowed to use the resulting pre-coding matrixes prohibited from being used by the cooperating base station over the scheduling resource.

16. A cooperating base station, comprising:
a receiver is configured to receive Channel State Information, CSI, reported by UEs;
a processor configured to determine resulting pre-coding matrixes prohibited from being used by the cooperating base station, according to a result of pre-negotiating with a serving base station;

perform resource scheduling according to the received CSI, and the resulting pre-coding matrixes prohibited from being used by the cooperating base station, wherein the processor is further configured to determine a set of candidate prohibited pre-coding matrixes according to the CSI reported by the UEs; receive an indicator, sent by the serving base station, of pre-coding matrixes requested for being prohibited from being used by the cooperating base station; and to determine a set of pre-coding matrixes requested by the serving base station for being prohibited from being used by the cooperating base station, according to the indicator; determine pre-coding matrixes in an intersection of the set of pre-coding matrixes requested by the serving base station for being prohibited from being used by the cooperating base station, and the set of candidate prohibited pre-coding matrixes as the resulting pre-coding matrixes prohibited from being used by the cooperating base station; and the receiver is configured to send an indicator of the resulting pre-coding matrixes prohibited from being used by the cooperating base station to the serving base station;

wherein the result of pre-negotiation can be used for multiple resource scheduling.

17. The cooperating base station according to claim 16, wherein the receiver is configured:

to send at least one PMI, and information about relevance range of each of the at least one PMI to the serving base station, wherein a pre-coding matrix corresponding to the at least one PMI, and a pre-coding matrix in the relevance range of each PMI constitute the resulting pre-coding matrixes prohibited from being used by the cooperating base station.

* * * * *